(12) United States Patent
Pedersen et al.

(10) Patent No.: US 8,783,726 B2
(45) Date of Patent: Jul. 22, 2014

(54) RIDEABLE SNOW SLED WITH REPLACEABLE NOSE SECTION

(75) Inventors: Bradley D. Pedersen, Mississauga (CA); Kyle Jeffs, Mississauga (CA)

(73) Assignee: Tech 4 Kids, Inc., Ontario (CA)

( * ) Notice: Subject to any disclaimer, the term of this patent is extended or adjusted under 35 U.S.C. 154(b) by 152 days.

(21) Appl. No.: 13/253,032

(22) Filed: Oct. 4, 2011

(65) Prior Publication Data
US 2012/0086179 A1 Apr. 12, 2012

Related U.S. Application Data

(60) Provisional application No. 61/389,685, filed on Oct. 4, 2010.

(51) Int. Cl.
*B62B 17/00* (2006.01)
*B62B 17/06* (2006.01)

(52) U.S. Cl.
CPC .................. *B62B 17/06* (2013.01)
USPC ........................................... 280/845

(58) Field of Classification Search
CPC ........ B60R 19/04; B62B 17/06; B62B 13/10; B62K 9/02
USPC ............ 280/16, 15, 845, 288.4; 180/184; 296/1.07
See application file for complete search history.

(56) References Cited

U.S. PATENT DOCUMENTS

| | | | | |
|---|---|---|---|---|
| 2,578,682 A * | 12/1951 | Fernstrom | | 280/1.14 |
| 3,398,970 A * | 8/1968 | Horiuchi | | 280/16 |
| 3,613,205 A * | 10/1971 | Takada | | 29/897.2 |
| 4,601,478 A * | 7/1986 | Robertson et al. | | 280/1.13 |
| 4,744,573 A * | 5/1988 | Most | | 280/1.13 |
| 5,335,925 A * | 8/1994 | Dolson | | 280/16 |
| 6,575,479 B2 * | 6/2003 | Combs | | 280/21.1 |
| 7,458,598 B2 * | 12/2008 | Giffin et al. | | 280/615 |

* cited by examiner

*Primary Examiner* — J. Allen Shriver, II
*Assistant Examiner* — Brian Cassidy
(74) *Attorney, Agent, or Firm* — Adam K. Sacharoff; Much Shelist

(57) ABSTRACT

A replaceable nose section is provided for use on a rideable snow sled wherein the nose section comprises a support structure which can be easily fitted to a snow sled, and a flexible, resilient nose section shell which is adapted to be fitted to the support structure. The support structure can be easily removed and replaced on the snow sled by the use of hooks and spring-loaded clasps, or the like, which attach to the handlebars and/or handlebar or steering assemblies of the snow sled. As such, the nose section can be easily removed from the support structure and/or the support structure can be easily removed from the snow sled. This facilitates replacement of the nose section on the snow sled.

5 Claims, 3 Drawing Sheets

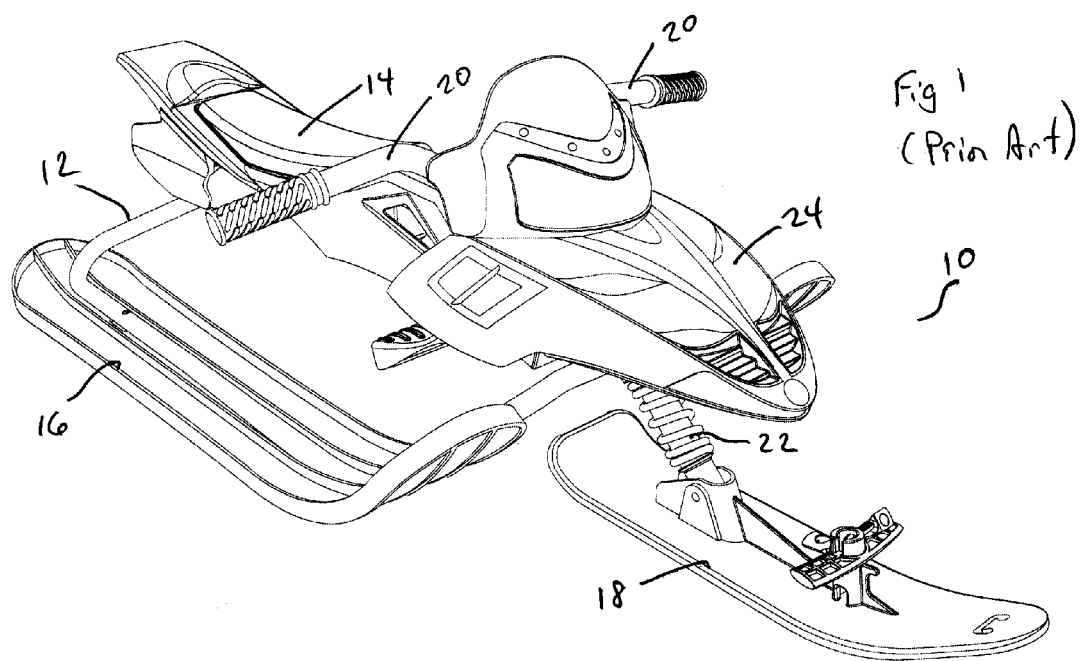

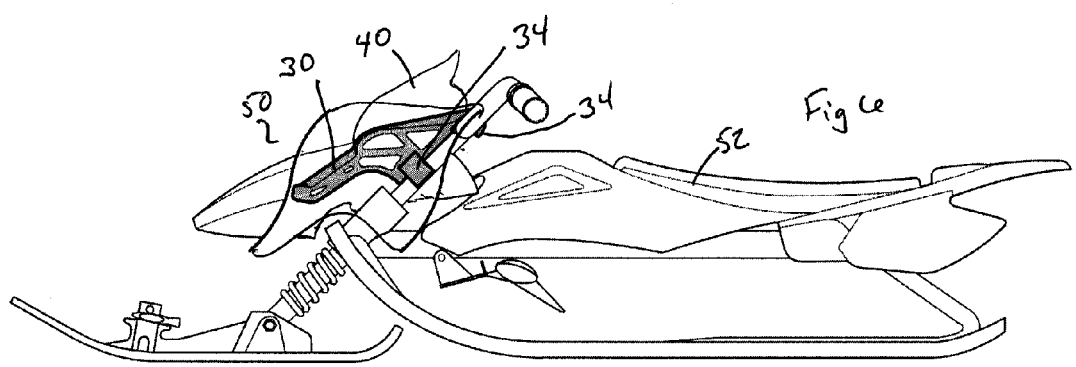

RIDEABLE SNOW SLED WITH REPLACEABLE NOSE SECTION

FIELD OF THE INVENTION

This invention relates generally to snow sled, and more particularly, to rideable snow sleds having front nose sections.

BACKGROUND OF THE INVENTION

Snow sleds are available in a wide variety of shapes and sizes. Of particular interest in the present invention are rideable snow sleds which typically include a seat section mounted on a pair of runners, or skis, and a central front ski attached to a moveable set of handlebars (similar to the handlebars of a bicycle), or other steering means. By movement of the handlebars, the position of the front ski can be rotated so as to steer the snow sled in a desired direction.

A further feature typically found on such products, is a nose section which can provide some aerodynamic features, but more typically is added for appearance, and design considerations.

Unfortunately, the nose section can be easily damaged in the event, for example, that the rideable snow sled overturns, or inadvertently runs into another object. As such, the nose section will require replacement.

Further, to customize the appearance of the snow sled, users frequently wish to modify or replace their existing nose sections which a nose section of their choice. Other reasons for wanting an easily replaceable nose section could be a rental outfit which wished to easily identify their snow sleds, or control the hills or trails on which the particular user is authorized to operate the rented snow sled.

Also, for competition applications, it would be useful to easily identify the different snow sleds of the different competitors using different coloured nose sections, for example.

However, current nose section design requires that the nose section be bolted onto the frame or steering column of the snow sled, using a bracket, and thus, changing the nose section is not an easy task without the use of some tools.

As such, it is an object of the present invention to provide a nose section, and more generally, a snow sled, in which the nose section can be easily and rapidly removed and replaced, and preferably without the need for any tools.

It is a further object of the present invention to provide a "break-away" nose section that will be released from the snow sled under impact rather than breaking.

SUMMARY OF THE INVENTION

An exemplary implementation of the snow sled, and snow sled nose section of the present invention, is a snow sled in which a support structure is fitted to a portion of the snow sled, such as the frame, or optionally a steering column and/or handlebar section of the snow sled, and wherein a resilient nose section shell, preferably made of a flexibly resilient material such as plastic, is releasably affixed to the support structure, by being friction fitted, snap-fitted, or the like, to the support structure.

The support structure is preferably a rigid device made of metal or plastic, and which can be bolted to the frame, steering column an/or handlebar section. More preferably though, the support structure can include spring-like clasps which are adapted to be snap-fitted around a portion of the snow sled, including, for example, the steering column of the handlebar assembly, and/or include hooks to be hooked over various frame members, and/or areas of the sled such as, for example, the central area of the handlebars, when present. Other locations might also be used, as well as other releasing systems, such as Velcro fasteners, or the like. Further, combinations of these approaches can also be used.

Preferably, the resilient nose section shell provides a decorative or customized exterior surface, but it preferably also includes a standardized interior surface which is adapted to be fitted around or over a standardized support structure. Preferably, the resilient nose section shell is friction fitted onto the support structure, but even more preferably, the resilient nose section shell is resiliently flexible so that it will flex sufficiently and the nose section shell can be snap fitted around the support structure, and thereby hold the nose section shell in position on the support structure.

Other temporary attachment systems might also be used, including for example, Velcro fasteners, or the like.

By being resiliently flexible some damage to the nose section shell can be avoided by flexing of the nose section shell. However, under minor impact, the nose section shell is released from the support structure, and damage to the nose section shell is reduced or eliminated. Additionally, or alternatively, the support structure can be released from the snow sled, under minor impact, with the intention to minimize damage to the nose section shell.

For situations where only quick replacement of the nose section shell is desired, screws, nuts, bolts, wing nuts, and the like can also be used to ensure that the nose section shell, and/or the support structure, are not inadvertently released from the support structure and/or snow sled. Preferably, however, no additional attachment devices are used, so that the nose section shell and/or support structure, can break-away from the sled, under minor impact, without damage to the nose section.

The support structure is preferably separate from the nose section, but in an alternative arrangement, the support structure can be integral with the nose section, so that the entire nose section is releasably attached to the snow sled, as a single unit.

As such, in a first aspect, the preset invention provides a snow sled having a nose section, wherein said nose section comprises a support structure which is fitted to a portion of said snow sled; and a replaceable, resilient nose section shell which is releasably fitted to said support structure.

In a second aspect, the present invention provides a replaceable nose section for a snow sled, comprising a support structure for attachment to the snow sled, and a flexible, resilient nose section shell which is adapted to be releasably attached to the support structure.

DETAILED DESCRIPTION OF THE INVENTION

In the present application, the term "snow sled" refers to a rideable snow sled. However, the skilled artisan will be aware that the term snow sled can also refer to a variety of snow sled-related devices such as ski bobs, snow bobs, toboggans, sledges, and the like, which can include nose sections. Accordingly, while the present application is described with particular reference to rideable snow sleds, the skilled artisan would be aware that the present application is equally applicable in other related applications.

BRIEF DESCRIPTION OF THE DRAWINGS

Embodiments of this invention will now be described by way of example only in association with the accompanying drawings in which:

FIG. 1 is a perspective view of a prior art snow sled;

FIG. 2 is a side view of a support structure for use as part of the of the replaceable nose section of the present invention;

FIG. 3 is a side view of a nose section shell which has been fitted over the support structure of FIG. 2;

FIG. 6 is a cut-away view of the snow sled of FIG. 5 wherein the support structure of FIG. 2 can be more easily seen.

DETAILED DESCRIPTION OF THE PREFERRED EMBODIMENTS

Figure 4:
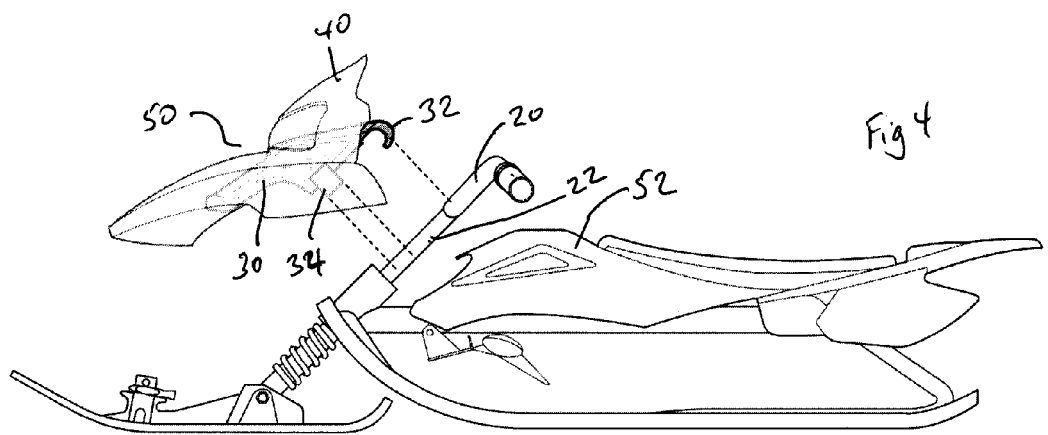
FIG. 4 is a side view of a snow sled in which the replaceable nose section of FIG. 3 is ready for fitting to a snow sled.

The novel features which are believed to be characteristic of the present invention, as to its structure, organization, use and method of operation, together with further objectives and advantages thereof, will be better understood from the following drawings in which a presently preferred embodiment of the invention will now be illustrated by way of example only. In the drawings, like reference numerals depict like elements.

It is expressly understood, however, that the drawings are for the purpose of illustration and description only and are not intended as a definition of the limits of the invention.

Referring to FIG. 1, an prior art snow sled is shown having the basic features of the snow sleds of interest in the present invention. These snow sleds 10 typically include a frame 12, a seat 14 fitted to frame 12, runners 16 on each side of sled 10, a front ski 18 which is operatively connected to handlebars 20 using a handlebar assembly 22, and a nose section 24 attached to frame 12 and/or handlebars 20 or handlebar assembly 22.

The specific shape and design of the snow sled can vary, but typically most rideable snow sleds are of the same general design as that shown in FIG. 1. It should be noted that nose section 24 is typically made of a fairly rigid plastic material, and most importantly, it should be noted that nose section 24 can have any desired shape or size depending on the preferences of the user and/or snow sled designer.

In the prior art snow sleds, nose section 24 is essentially permanently attached to frame 12, or handlebars 20, using a bracket, screws, and/or nuts and bolts (not shown), or the like.

In FIG. 2, a support structure element 30 for the replaceable nose section of the present invention is shown. Support structure 30 is made of metal, such as steel or aluminum, but can also be made of rigid or semi-rigid plastic. Use of other materials, however, is not excluded.

Support structure 30 includes a hook 32 which is adapted to be hooked over the central area of handlebars 20, and a spring-loaded clasp 34 (or snap, or the like) which is adapted to be fitted around the steering column of handlebar assembly 22. As such, support element 30 can be easily and rapidly installed or removed from a snow sled.

In FIG. 3, a flexible snow sled nose section shell 40 is shown which has been inserted over support structure 30 (which structure 30 is shown primarily in outline). Shell 40 is preferably designed so that its internal surface corresponds to the external shape of support structure 30. Shell 40 is flexed so as to be fitted around the outside of support structure 30, and then release so as to "snap" back into shape, and be held on support structure 30. With this snap-fitting technique, shell 40 can be easily removed and replaced on support structure 30.

Other techniques for fitting shell 40 to support structure 30, such as by Velcro fasteners, might also be employed.

In FIG. 4, the assembled replaceable nose section 50 comprising shell 40 and support structure 30 (again primarily shown in outline), is shown positioned above snow sled 52. In particular, hook 32 is positioned to be placed over the central area of handlebars 20, and spring-loaded clasp 34 is positioned to be fitted around the steering column of handlebar assembly 22.

Figure 5:
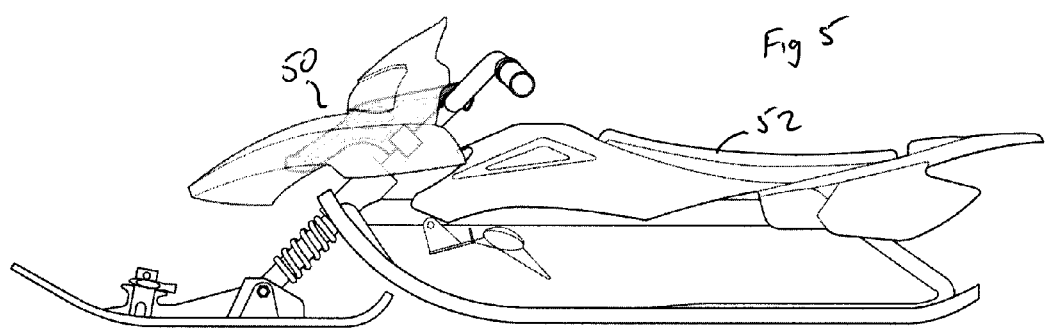
FIG. 5 is a side view of the snow sled of FIG. 4 with the replaceable nose section of FIG. 3, in place.

In FIG. 5, the assembly replaceable nose section 50 has been fitted to snow sled 52, and in FIG. 6, a portion of nose shell 40 has been cut away to provide a clearer view of the attachment of support structure 30 to snow sled 52.

To replace the nose section, the support structure 30 and the attached shell 40 are removed from snow sled 52, and shell 40 is removed from support structure 30. A different shell 40(a) can then be fitted to support structure 30 in the manner previously described, and the modified nose section can be replaced on to snow sled 52.

It will be clearly understood however, that the device of the present invention can equally be used in such a fashion that the support structure 30 is fitted to snow sled 52 prior to connection of shell 40 to support structure 30 and/or that shell 40 can be removed from support structure 30 without removing support structure 30 from snow sled 52.

Moreover, it will be seen that when the nose section 50 is attached to snow sled 52 using only the hook 32 and the spring-loaded or snap clasp 34 on the support structure 30, the entire nose section 50 can easily break-away from sled 52, under impact, and thus, minimize or eliminate damage to nose section 50.

Thus, it is apparent that there has been provided, in accordance with the present invention, a snow sled, and more particularly, a replaceable snow sled nose section, which fully satisfies the goals, objects, and advantages set forth hereinbefore. Therefore, having described specific embodiments of the present invention, it will be understood that alternatives, modifications and variations thereof may be suggested to those skilled in the art, and that it is intended that the present specification embrace all such alternatives, modifications and variations as fall within the scope of the appended claims.

Additionally, for clarity and unless otherwise stated, the word "comprise" and variations of the word such as "comprising" and "comprises", when used in the description and claims of the present specification, is not intended to exclude other additives, components, integers or steps.

Moreover, the words "substantially" or "essentially", when used with an adjective or adverb is intended to enhance the scope of the particular characteristic; e.g., substantially planar is intended to mean planar, nearly planar and/or exhibiting characteristics associated with a planar element.

Also, unless otherwise specifically noted, all of the features described herein may be combined with any of the above aspects, in any combination.

Further, use of the terms "he", "him", or "his", is not intended to be specifically directed to persons of the masculine gender, and could easily be read as "she", "her", or "hers", respectively.

Finally, while this discussion has addressed prior art known to the inventor, it is not an admission that all art discussed is citable against the present application.

What is claimed is:

1. A snow sled comprising:
a frame;
a seat fitted to the frame;
a pair of runner skis separately coupled to sides of the frame;
a rotatable handlebar assembly coupled to the frame;

a front ski being connected to said handlebar assembly for rotation therewith;

wherein the handlebar assembly has a pair of handlebars extending outwardly from a central steering column; and a two piece nose section being defined to have a resilient nose section shell releasably fitted to a support structure, and wherein the support structure is defined as having a pair of hooks extending from a top portion of the support structure, the pair of hooks configured to be hooked over said handlebars, and said support structure being further defined as having a clasp extending from a midsection of the support structure and configured to be secured around a portion of said steering column.

2. A snow sled as claimed in claim 1 wherein said nose section shell is releasably affixed to said support structure by being friction fitted or snap-fitted to said support structure, or is attached to said support structure by using Velcro fasteners.

3. A snow sled as claimed in claim 2 wherein said nose section shell is fabricated from a flexibly resilient material.

4. A snow sled as claimed in claim 2 wherein said nose section shell is friction fitted onto the support structure, or is snap fitted around the support structure, and thereby hold the nose section shell in position on the support structure.

5. A snow sled as claimed in claim 2 wherein said nose section shell is releasably fitted to said support structure, so that said nose section shell will be released from said support structure, under impact on said nose section.

* * * * *